United States Patent Office 3,377,532
Patented Apr. 9, 1968

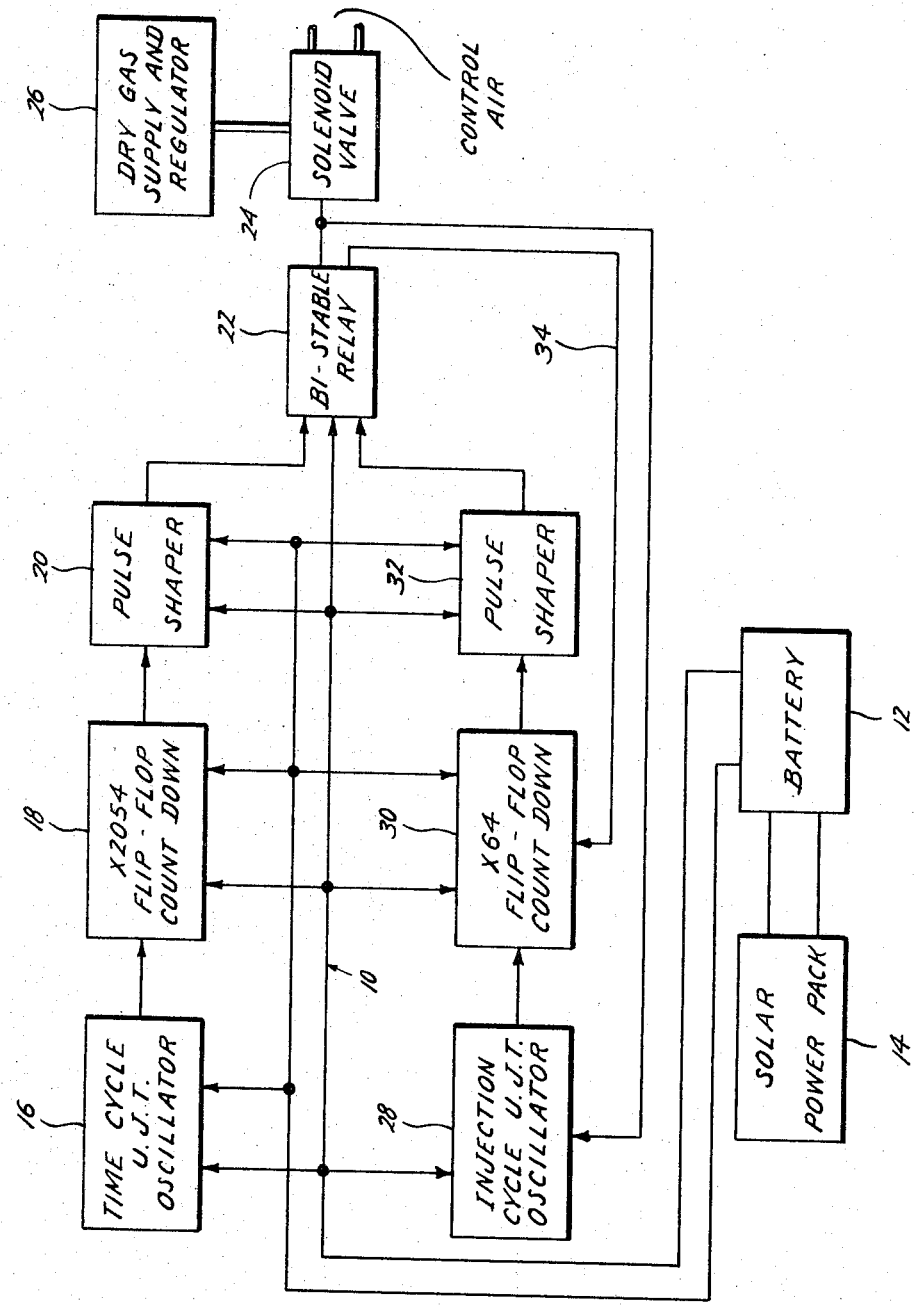

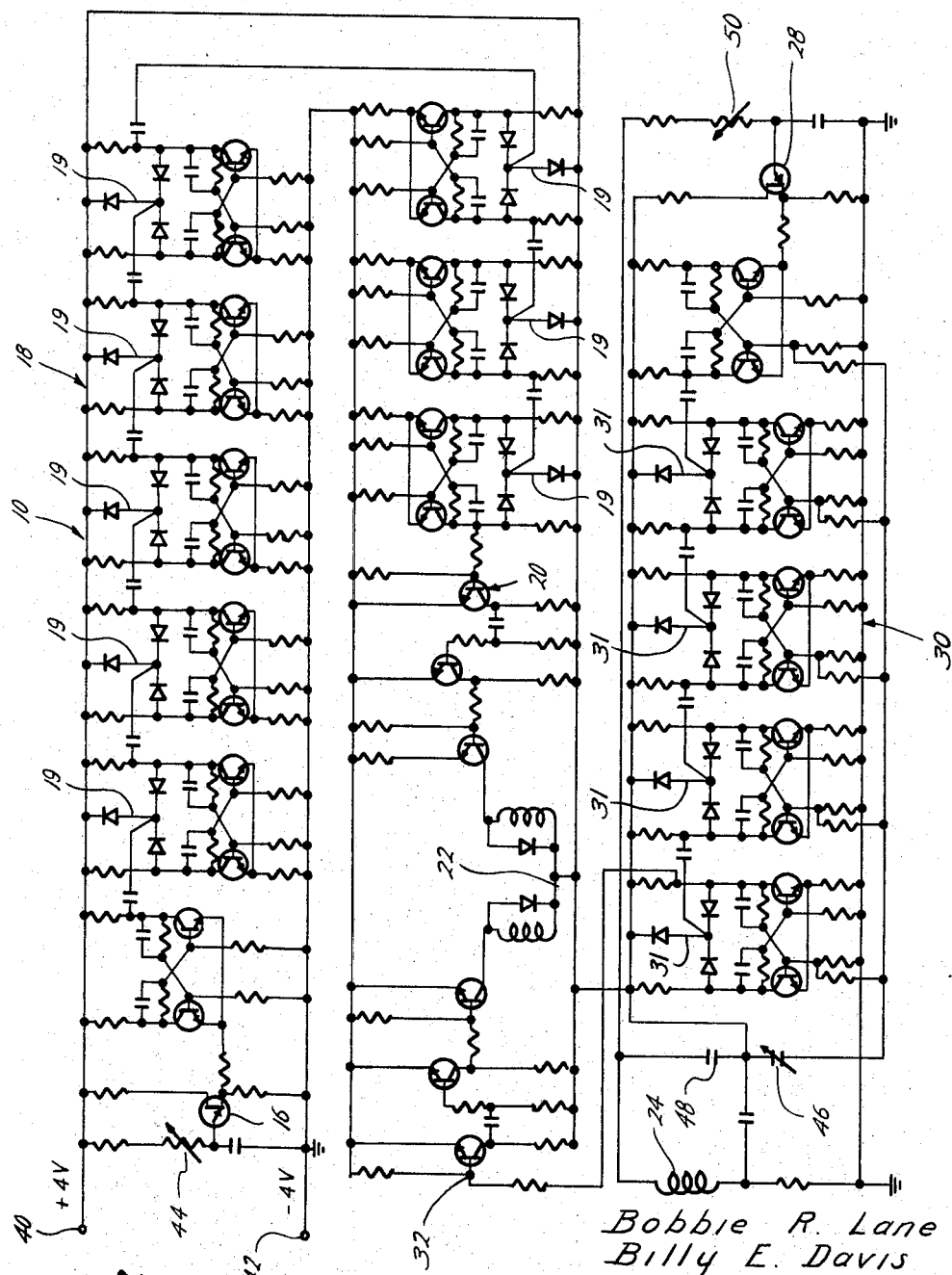

3,377,532
TIME CYCLE CONTROLLER
Bobbie R. Lane and Billy E. Davis, Houston, Tex., assignors to Camco, Incorporated, Houston, Tex., a corporation of Texas
Filed Aug. 27, 1965, Ser. No. 483,289
1 Claim. (Cl. 317—262)

ABSTRACT OF THE DISCLOSURE

A low power consumption gas lift timing controller operating from a battery having a timing cycle oscillator, a first flip flop divider circuit for selecting a timing cycle and actuating a first pulse shaper which in turn actuates a bi-stable relay to control a solenoid valve for supplying flow of gas to the well, and an injection cycle oscillator which is also time controlled by a second flip flop divider circuit which in turn is connected to a second pulse shaper for deactuating the bi-stable relay, and a resetting circuit.

---

The present invention relates to a time cycle controller, and more particularly, relates to an automatic time cycle controller having dual time cycles for providing automatic timing control in remote and unattended locations.

By way of example only, the time cycle controller of the present invention will be described for controlling intermittent gas injection to provide gas lift operation for wells, but it is to be understood that the present controller may be used for any application that requires a dual time function operation to occur at predetermined intervals of time.

Generally, gas is frequently supplied to a well to provide the motive force for lifting production therefrom. However, if the gas is provided at too frequent intervals or for too long periods of time the operating costs are excessive. On the other hand, if the gas is provided at too slow a rate or for too short periods of time optimum production from the well is not obtained. Therefore, it is desired to operate a valve by a controller which can vary not only the intervals at which the valve is open, but which can vary the length of time that the valve is open. In addition, it is desirable that the time cycle controller be provided which is fully automatic and able to operate in remote locations for long periods of time during which it is unattended, and which requires a minimum of energy consumption.

The present invention is generally directed to a time cycle controller which is automatic and requires a low rate of power consumption.

A still further object of the present invention is the provision of a time cycle controller which will operate in remote locations on a battery unattended for long periods of time and which includes a first timing cycle oscillator having a variable timing frequency for providing a predetermined timing cycle which in turn initiates a second timing oscillator for controlling the period of operation thereby providing an intermittent and fully automatic operation cycle for unattended operation over a period of months.

Yet a further object of the present invention is the provision of a time cycle controller having a first low power consumption timing cycle oscillator for providing a variable time cycle, a first pulse dividing circuit for dividing the timing pulses of the oscillator, switching means such as a bi-stable relay actuated by the timing oscillator and which requires the minimum of power consumption, and which in turn actuates a second timing oscillator which controls the length of operation, a second pulse dividing circuit connected to the second oscillator dividing the timing pulses of the oscillator, and a resetting circuit actuated by the relay to reset the second pulse dividing circuit each cycle.

Still a further object of the present invention is the provision of a gas lift timing cycle controller for providing timing cycles of gas injection from a gas supply for a well by providing a battery power source including a solar cell connected thereto for charging the battery, a timing cycle oscillator having a variable frequency for providing predetermined timing cycles for initiating gas lift, a first plurality of flip flop divider circuits connected to the timing cycle oscillator output for dividing the oscillator pulses and which is in turn connected to a first pulse shaper to spread the wave shape of the timing pulses for actuating a bi-stable relay which in turn actuates a solenoid valve for controlling the flow of gas to the well, and an injection cycle oscillator having a variable frequency which is actuated by the relay and also includes a second plurality of flip flop divider circuits for reducing the timing pulses of the injection oscillator for controlling the time interval of gas injection, and a resetting circuit actuated by the relay to reset the second plurality of flip flop divider circuits for automatic cycle operation.

Other and further objects, features, and advantages will be apparent from the following description of a presently preferred embodiment of the invention, given for the purpose of disclosure, and taken in conjunction with the accompanying drawings, where like character references designate like parts throughout the several views, and where, FIGURE 1 is an electrical block diagram illustrating the time cycle controller of the present invention, and FIGURE 2 is an electrical schematic of the apparatus of FIGURE 1.

Referring now to the drawings, and particularly to FIGURE 1, the reference numeral 10 generally indicates the time cycle controller of the present invention. The controller 10 includes a suitable power source such as a battery 12 for operating the controller in remote locations for unattended operations and preferably includes a solar power pack 14 for recharging the battery 12.

The controller 10 includes a first timing cycle oscillator 16 having an adjustable frequency for providing selected timing pulses at predetermined intervals. A first pulse dividing circuit 18 is connected to the output of the oscillator 16 to divide the timing cycles by a predetermined amount so that the oscillator 16 may operate in an optimum range. A first pulse shaper 20 is connected to the divider circuit 18 for spreading out the wave shape of the timing pulse to provide a suitable wave shape for actuating a switching means such as a bi-stable relay 22. Actuation of the relay 22 will actuate any suitable control means such as a solenoid valve 24 which can provide a supply of dry gas from a suitable supply and regulator 26 to a well (not shown) to provide gas for a gas lift operation. Thus, the first oscillator 16 provides a continuous timing cycle which will periodically provide a selected timing pulse to actuate the bi-stable relay 22 for actuating a suitable control.

A second timing cycle oscillator 28 having an adjustable frequency is connected to and is actuated by the bi-stabe relay 22. A second pulse dividing circuit 28 is connected tothe second oscillator 28 for dividing the timing pulse from the oscillator 28 so that the oscillator 28 may operate at its optimum condition. Similarly, a pulse shaper 32 is provided to receive the timing pulse of the second oscillator 28 to shape the timing wave shape for deactuating the bi-stable relay 22 which in turn deactuates the solenoid valve 24 for shutting down the operation cycle after a predetermined amount of time. In addition a resetting circuit 34 is connected from the relay 22 to the second divider circuit 30 for resetting the divider circuit for the next cycle of operation.

Referring now to FIGURE 2, the electrical components of the present time cycle controller are shown in greater detail. Thus, power leads 40 and 42 are provided for connection to a suitable power source such as the battery 12 (FIGURE 1) and are in turn connected to the first timing cycle oscillator 16 which includes a variable potentiometer 44 for varying the frequency of oscillation of the oscillator 16 over a wide range to provide a selected time interval of operation. A first pulse dividing circuit 18 which may include a plurality of flip flop dividing circuits 19 which will each inturn divide the timing pulse output of the oscillator 16 by a factor of two and will transmit the divided timing pulse to a first pulse shaper generally indicated by the numeral 20 for shaping the wave for turning on the bi-stable relay 22.

The bi-stable relay 22 includes a normally closed contact 46 and a normally open contact 48. Actuation of the relay 22 closes contact 48 thereby energizing solenoid valve coil 24 for starting the operation cycle. In addition, the closing of contact 48 actuates the second oscillator 28 which includes a variable potentiometer 50 for varying the frequency of oscillator 28 and thus providing a selected timing cycle. A second pulse dividing circuit 30, which may also include a plurality of flip flop divider circuits 31, is connected to the output of oscillator 28 and in turn transmits the divided timing pulse of the oscillator 28 to a second pulse shaper circuit 32 for shaping the timing pulse wave from oscillator 28 for deactuation of the bi-stable relay 22. Thus, the preselected timing pulse from the oscillator 28 is applied to the bi-stable relay 22 for deactuation of relay 22, which in turn opens contact 48 deactuating timing oscillator 28 and closes contact 46 which resets the flip flop divider circuits 31 in the second pulse dividing circuit 30 in preparation for the next cycle of operation. In addition, the opening of contact 48 will deactuate the solenoid valve 24 thereby terminating the operation cycle.

In use, the time cycle controller 10, when used for intermittent gas lift injection, provides a fully automatic time cycle control in remote and unattended locations. The time cycle selected for each oscillator is variable over a wide range and the potentiometer 44 in oscillator 16 and the potentiometer 50 in the oscillator 28 is suitably adjusted to provide the desired time and injection intervals. For instance, the basic time cycle oscillator 16 may be suitably adjustable from 0.1 hr. to 10 hrs., and the injection time cycle oscillator 28 may be adjustable from 0.2 min. to 20 min. Thus, the potentiometers 44 and 50 provide adjustable means for varying the timing cycles of oscillators 16 and 28 respectively, for precise adjustment and synchronization of the timing and injection cycles.

It is to be noted that the controller 10 consumes a minimum of energy. For instance, during the time the time cycle oscillator 16 is on, no electrical power is supplied to the relay 22, the second oscillator 28, or to the solenoid valve 24. Furthermore, the bi-stable relay does not require continuous current, but merely acts as a switch to turn on the solenoid valve and the injection cycle oscillator 28, which is a short duration work cycle. In addition, the solar power pack 14 is able to recharge the battery 12.

Thus, as previously described the time cycle oscillator 16 will proceed through its predetermined and preset time cycle to provide a timing signal to the dividing circuit 18 and the pulse shaper 20 to actuate the bi-stable relay 22 which turns on the solenoid valve 24 to supply dry gas from the supply regulator 26 to a well to start the beginning of a work cycle. At the same time the relay 22 by means of closing contact 48 (FIGURE 2) acts to initiate oscillator 28 which provides a second timing pulse through the dividing circuit 30, the pulse shaper 32 to deactuate the bi-stable relay 22 and shut down the solenoid valve to end of the work cycle, and actuates the resetting circuit 34 to reset the second pulse dividing circuit 30 to prepare it for the next work cycle.

The present invention, therefore, is well-adapted to carry out the objects and attain the ends and advantages mentioned as well as others inherent therein. While a presently preferred embodiment of the invention has been given for the purpose of disclosure, numerous changes in the details of construction and arrangement of parts may be made which will readily suggest themselves to those skilled in the art and which are encompassed within the spirit of the invention and the scope of the appended claims.

What is claimed is:

1. A gas lift timing controller for providing timed cycles of gas injection from a gas supply for a well comprising, a battery, a timing cycle oscillator having an adjustable potentimeter for varying the oscillator frequency connected to said battery, a first plurality of flip flop divider circuits connected to the timing cycle oscillator output, a first pulse shaper connected to the output of the divider circuits, a bi-stable relay connected to said first pulse shaper and actuated by a timing pulse from said timing cycle oscillator, a solenoid valve controlling the flow of gas to said well, said valve connected to and actuated by said relay, an injection cycle oscillator having an adjustable potentiometer for varying the oscillator frequency connected to said battery and actuated by said relay, a second plurality of flip flop divider circuits connected to the output of said injection cycle oscillator, a second pulse shaper connected to the output of said second divider circuits, said second pulse shaper output connected to said relay for deactuating said relay on receiving a timing pulse from said injection oscillator, and a resetting circuit connected to and resetting said second plurality of flip flop divider circuits, said resetting circuit connected to and actuated by said relay.

References Cited

UNITED STATES PATENTS

| | | | |
|---|---|---|---|
| 2,780,765 | 2/1957 | Chapin et al. | 320—2 |
| 3,325,657 | 6/1967 | Corey | 307—141 X |

LEE T. HIX, *Primary Examiner.*